United States Patent [19]

Hirosaki et al.

[11] Patent Number: 4,810,678

[45] Date of Patent: Mar. 7, 1989

[54] GAS PRESSURE SINTERING OF SILICON NITRIDE WITH ADDITION OF RARE EARTH OXIDES

[75] Inventors: Naoto Hirosaki; Akira Okada, both of Yokohama, Japan

[73] Assignee: Nissan Motor Co., Ltd., Yokohama, Japan

[21] Appl. No.: 117,543

[22] Filed: Nov. 6, 1987

[30] Foreign Application Priority Data

Nov. 10, 1986 [JP] Japan ................. 61-265565

[51] Int. Cl.$^4$ ............................................. C04B 35/58
[52] U.S. Cl. ........................................ 501/97; 501/98; 501/152; 264/65
[58] Field of Search ............................. 501/97, 98, 152; 264/65

[56] References Cited

U.S. PATENT DOCUMENTS 4,113,830 9/1978 Mazdiyasni et al. ............ 501/97
4,332,909 6/1982 Nishida et al. .................. 501/97
4,609,633 9/1986 Fukuhara et al. ............... 501/97

FOREIGN PATENT DOCUMENTS 55-51766   4/1980  Japan .
55-116671  9/1980  Japan .
59-116176  7/1984  Japan .
59-190274 10/1984  Japan .
59-199578 11/1984  Japan .
60-255674 12/1985  Japan .

OTHER PUBLICATIONS

Sanders et al, *Strength and Microstructure of Sintered $Si_3N_y$ with Rare-Earth-Oxide Additions*, Cer. Bull. vol. 64 No. 2 1985.

*Primary Examiner*—William R. Dixon, Jr.
*Assistant Examiner*—David M. Brunsman
*Attorney, Agent, or Firm*—Foley & Lardner Schwartz, Jeffery Schwaab, Mack Blumenthal & Evans

[57] ABSTRACT

A silicon nitride base sintered body having high strength at normal and high temperatures is obtained by a nitrogen gas atmosphere pressure sintering method using a combination of $Y_2O_3$ and $Nd_2O_3$ and/or $Sm_2O_3$ as a sintering aid. The molar ratio of $Y_2O_3$ to $Nd_2O_3$ and/or $Sm_2O_3$ is from 9:1 to 1:9. The pressure of the nitrogen gas atmosphere is not lower than 1 atm and is lower than 500 atm. The sintering temperature is 1750°–2200° C.

5 Claims, No Drawings

GAS PRESSURE SINTERING OF SILICON NITRIDE WITH ADDITION OF RARE EARTH OXIDES

BACKGROUND OF THE INVENTION

This invention relates to a method of producing a silicon nitride base sintered body which is high in mechanical strength at normal and high temperatures.

Silicon nitride base sintered bodies are chemically stable at both normal and high temperatures and, when properly sintered, possess high mechanical strength. Accordingly silicon nitride ceramics are suitable materials for bearings and the like and for engine parts represented by turbocharger rotors, and, furthermore, will have much applications in wide fields of industry including automobiles, machinery, chemical apparatus and aerospace devices.

Silicon nitride is rather inferior in sinterability so that it is difficult to accomplish good sintering of practically pure silicon nitride, $Si_3N_4$, to obtain a sufficiently densified ceramic body. Therefore, it is usual to add a sintering aid such as MgO or a combination of $Al_2O_3$ and $Y_2O_3$ to silicon nitride powder to be compacted and sintered. As is commonly accepted, sintering of the raw material containing such a sintering aid proceeds as a sort of liquid phase sintering through the medium of a liquid phase provided by the heated sintering aid. As a result, a glass phase which originates from the liquid phase will exist in the sintered ceramic body. The glass phase significantly and unfavorably affects important characteristics of the sintered body such as creep resistance, high temperature strength and oxidation resistance. Particularly when the glass phase in a silicon nitride base sintered body is relatively low in softening temperature, the sintered body is considerably degraded in its mechanical characteristics at high temperatures.

It is known to employ a hot press sintering method for accomplishment of good sintering of silicon nitride with reduced addition of sintering aid as the origin of an unfavorable glass phase. By this method it is possible to obtain sufficiently densified sintered bodies that exhibit good mechanical characteristics even at high temperatures. However, it is impracticable to produce sintered bodies of intricate shapes by this method. Also it is known to sinter silicon nitride with addition of aluminum oxide and aluminum nitride so as to produce a solid solution, viz. β-sialon, to thereby incorporate the liquid phase originating from aluminum oxide into the silicon nitride particles under sintering. However, β-sialon is very low in mechanical strength at normal temperature, though the strength does not greatly change by heating.

SUMMARY OF THE INVENTION

It is an object of the present invention to provide a method of producing a silicon nitride base sintered body which is sufficiently densified and possesses high mechanical strength at both normal and high temperatures.

According to the invention, a combination of $Y_2O_3$ and at least one additional metal oxide selected from $Nd_2O_3$ and $Sm_2O_3$ is used as sintering aid on condition that the molar ratio of $Y_2O_3$ to $Nd_2O_3$ and/or $Sm_2O_3$ is from 9:1 to 1:9. A powder mixture comprising a silicon nitride powder as the principal material and said combination of metal oxides is shaped into a green body, and the green body is sintered in a nitrogen gas atmosphere the pressure of which is not lower than 1 atm and is lower than 500 atm at a temperature in the range from 1750° to 2200° C.

$Y_2O_3$ is known as a sintering agent for silicon nitride ceramics. However, $Y_2O_3$ is very high in melting point (about 2410° C.) and, therefore, when $Y_2O_3$ alone is used as sintering aid good sintering of silicon nitride can hardly be accomplished at temperatures (1600°–2200° C.) employed in usual normal pressure sintering or gas pressure sintering because a sufficient quantity of low-viscosity liquid phase is not produced. Accordingly, thus far $Y_2O_3$ has been used in the cases of sintering silicon nitride under very high pressures created by a mechanical means such as a hot press.

The present invention is a gas atmosphere sintering method, and in this invention $Y_2O_3$ is used in combination with $Nd_2O_3$ and/or $Sm_2O_3$. As a sintering aid, such a combination of oxides begins to melt at a temperature considerably lower than the melting point of $Y_2O_3$ so that a liquid phase is produced in a quantity sufficient for smooth sintering when the gas atmosphere sintering is carried out at 1750°–2200° C. A glass phase produced by cooling of this liquid phase is higher in softening temperature than the glass phases attributed to the conventional sintering aids such as MgO and $Al_2O_3$-$Y_2O_3$. Therefore, in silicon nitride base sintered bodies obtained by the method of the invention, lowering of mechanical strength is relatively little even though a glass phase originating from the sintering aid exists in the sintered bodies.

DESCRIPTION OF THE PREFERRED EMBODIMENTS

In this invention the principal material is a silicon nitride powder. It is preferable to use a silicon nitride powder at least a major portion of which is α-$Si_3N_4$, though it is also possible to use a powder of β-$Si_3N_4$ or amorphous $Si_3N_4$. It is suitable that the silicon nitride powder has a mean particle size not larger than 5 μm, and preferably not larger than 1 μm.

Both $Y_2O_3$ and/or $Sm_2O_3$ are used in fine powder form. If desired for some reasons any of these metal oxides may be replaced by, for example, a hydroxide or carbonate of the same metal which is converted into oxide by the heat treatment for sintering. The proportion of $Y_2O_3$ to $Nd_2O_3$ and/or $Sm_2O_3$ must be in the range from 90:10 to 10:90 by mol. If the amount of $Y_2O_3$ in the sintering aid is more than 90 mol % it is impossible to produce a sufficient quantity of liquid phase in the green body under sintering, and therefore densification by the sintering remains insufficient. If the amount of $Y_2O_3$ in the sintering aid is less than 10 mol % it is difficult to obtain a sintered body having sufficiently high strength. In the powder mixture of silicon nitride and the sintering aid an optimum amount of the sintering aid is variable depending on the proportion of $Nd_2O_3$ and/or $Sm_2O_3$. In general it is suitable for densifying and strengthening the sintered body that the sintering aid amounts to 5–30 wt % of the powder mixture. Use of an excessively large amount of the sintering aid results in lowering of high temperature strength of the sintered body.

The method for shaping the powder mixture into a green body is not particularly limited. A suitable method can be selected from conventional shaping methods for ceramics such as, for example, metal die press shaping, rubber press shaping and injection molding according to the shape of the sintered body to be produced.

In this invention sintering of the green body is performed in a nitrogen gas atmosphere. It is preferable to use 100% nitrogen gas atmosphere, though it is also possible to use a mixed gas of nitrogen and another inactive gas. The pressure of the nitrogen gas atmosphere must not be lower than 1 atm and must be lower than 500 atm. The range of from 2 to 100 atm is preferred. Nitrogen gas is used to prevent oxidation of silicon nitride and suppress decomposition of the same. If the pressure of the nitrogen gas atmosphere is lower than 1 atm such effects of nitrogen remain insufficient. If the pressure of the gas atmosphere is not lower than 500 atm, the last stage of sintering does not well proceed so that densification of the silicon nitride body remains incomplete.

The gas pressure sintering in this invention is carried out at a temperature in the range from 1750° to 2200° C., though an optimum temperature depends on the composition of the raw material powder mixture and the size of the green body. If the sintering temperature is below 1750° C. the sintering aid does not provide a liquid phase so that the sintered material is not well densified. If the sintering temperature is above 2200° C. there occurs undesirable growth of silicon nitride particles so that the sintered body becomes lower in mechanical strength. Optionally and particularly when sintering is carried out at a relatively high temperature, the green body may be covered with, for example, a mixed powder of $Si_3N_4$ and $SiO_2$ to suppress outflow of SiO gas formed during sintering.

EXAMPLES 1-9

In these examples the principal raw material was a silicon nitride powder which contained more than 90 wt % of $\alpha$-$Si_3N_4$ and was smaller than 1 μm in mean particle size. In the respective examples the silicon nitride powder was mixed with $Y_2O_3$ powder and $Nd_2O_3$ powder in the proportions shown in Table 1. In every example the powder mixture was compacted first by metal mold press shaping under pressure of 200 kg/cm$^2$ and then by using a rubber press with application of a pressure of 2000 kg/cm$^2$ to form green bodies in the shape of a plate 5 mm thick, 6 mm wide and 50 mm long. The green bodies were sintered in a nitrogen gas atmosphere the pressure of which was 100 atm for 1 hr at a temperature shown in Table 1. The sintered bodies were ground to obtain specimens in the shape of a plate 3 mm thick, 4 mm wide and 40 mm long. These specimens were subjected to measurement of deflective strength at 25° C. and at 1300° C. by the three-point flexural test method according to JIS R 1601. The results were as shown in Table 1, wherein each strength value at 25° C. is an average of 15 specimens and each strength value at 1300° C. is an average of 3 specimens.

As can be seen in the table, the sintered bodies of every example had high density and sufficiently high strength at room temperature and were fairly little in lowering of the strength when measured at 1300° C.

COMPARATIVE EXAMPLES 1-5

For comparison, the preparation of the green bodies and sintering of the same in the foregoing examples were modified only in the following respects.

In Comparative Examples 1 and 2, $Y_2O_3$ alone was used as sintering aid as shown in Table 1. In Comparative Examples 3-5, a combination of $Y_2O_3$ and $Nd_2O_3$ was used in accordance with the invention, as shown in Table 1, but the sintering temperature was lowered to 1700° C.

In every Comparative Example the sintered bodies were very low in density as shown in Table 1 and, therefore, were unworthy of testing of deflective strength.

TABLE 1

| | Composition (wt %) | | | $Y_2O_3/Nd_2O_3$ (by mol) | Sintering Temperature (°C.) | Sintered Body | | |
|---|---|---|---|---|---|---|---|---|
| | $Si_3N_4$ | $Y_2O_3$ | $Nd_2O_3$ | | | Density (g/cm$^3$) | Strength at 25° C. (kgf/mm$^2$) | Strength at 1300° C. (kgf/mm$^2$) |
| Ex. 1 | 83.3 | 11.2 | 5.5 | 3/1 | 1900 | 3.13 | 55.5 | 50.0 |
| Ex. 2 | 81.8 | 7.3 | 10.9 | 1/1 | 1900 | 3.38 | 60.3 | 55.8 |
| Ex. 3 | 80.3 | 3.6 | 16.1 | 1/3 | 1900 | 3.48 | 65.3 | 45.2 |
| Ex. 4 | 83.3 | 11.2 | 5.5 | 3/1 | 2000 | 3.38 | 73.1 | 59.1 |
| Ex. 5 | 81.8 | 7.3 | 10.9 | 1/1 | 2000 | 3.48 | 66.5 | 54.0 |
| Ex. 6 | 80.3 | 3.6 | 16.1 | 1/3 | 2000 | 3.50 | 64.3 | 47.2 |
| Ex. 7 | 74.4 | 17.1 | 8.5 | 3/1 | 1800 | 3.05 | 50.2 | 39.0 |
| Ex. 8 | 72.4 | 11.1 | 16.5 | 1/1 | 1800 | 3.32 | 56.7 | 42.6 |
| Ex. 9 | 70.6 | 5.4 | 24 | 1/3 | 1800 | 3.35 | 59.4 | 40.3 |
| Comp. Ex. 1 | 84.8 | 15.2 | — | | 1800 | 2.40 | | |
| Comp. Ex. 2 | 84.8 | 15.2 | — | | 1900 | 2.89 | | |
| Comp. Ex. 3 | 83.3 | 11.1 | 5.5 | 3/1 | 1700 | 2.10 | | |
| Comp. Ex. 4 | 81.8 | 7.3 | 10.9 | 1/1 | 1700 | 2.30 | | |
| Comp. Ex. 5 | 80.3 | 3.6 | 16.1 | 1/3 | 1700 | 2.38 | | |

EXAMPLES 10-13

In these examples $Sm_2O_3$ was used in combination with $Y_2O_3$. Using the same silicon nitride powder as in Examples 1-9, powder mixtures of the compositions shown in Table 2 were respectively press-shaped and sintered in the same manner as in Examples 1-9. The sintered plates of each example were subjected to the deflection test at 25° C. and at 1300° C. As shown in Table 2, the sintered plates of every example were high in density and had a sufficiently high strength at room temperature and retained a fairly high strength even at 1300° C.

COMPARATIVE EXAMPLES 6-8

These comparative examples relate to sintering of silicon nitride by using sintering aids not in accordance with the present invention. As shown in Table 2, a combination of $Y_2O_3$ and $Al_2O_3$ was used in Comparative Example 6 and MgO in Comparative Example 7. In Comparative Example 8, $Al_2O_3$ and AlN were used to produce the structure of $\beta$-sialon. In every case shaping of green bodies and sintering of the same were carried out in the same manner as in Examples 1–9. The sintered plates of each comparative example were subjected to the deflection test. The results are shown in Table 2. The sintered plates of Comparative Examples 6 and 7 had very high strength at room temperature, but at 1300° C. they became very low in strength. The sintered plates of Comparative Example 8 were very low in strength at 25° C., though only slight lowering of strength was exhibited at 1300° C.

TABLE 2

| | Composition (wt %) | | | $Y_2O_3/SnO_3$ (by mol) | Sintering Temperature (°C.) | Sintered Body | | |
|---|---|---|---|---|---|---|---|---|
| | | | | | | Density ($g/cm^3$) | Strength at 25° C. ($kgf/mm^2$) | Strength at 1300° C. ($kgf/mm^2$) |
| | $Si_3N_4$ | $Y_2O_3$ | $Nd_2O_3$ | | | | | |
| Ex. 10 | 83.2 | 11.1 | 5.7 | 3/1 | 1900 | 3.15 | 55.3 | 45.0 |
| Ex. 11 | 81.5 | 7.3 | 11.2 | 1/1 | 1900 | 3.35 | 60.0 | 43.5 |
| Ex. 12 | 83.2 | 11.1 | 5.7 | 3/1 | 2000 | 3.45 | 76.5 | 46.8 |
| Ex. 13 | 81.5 | 7.3 | 11.2 | 1/1 | 2000 | 3.50 | 64.2 | 42.4 |
| | $Si_3N_4$ | $Y_2O_3$ | $Al_2O_3$ | MgO | AlN | | | |
| Comp. Ex. 6 | 85 | 10 | 5 | — | — | 1700 | 3.22 | 85.0 | 28.5 |
| Comp. Ex. 7 | 90 | — | — | 10 | — | 1700 | 3.15 | 90.1 | 12.3 |
| Comp. Ex. 8 | 66.2 | — | 24.1 | — | 9.7 | 1800 | 3.10 | 35.3 | 33.2 |

What is claimed is:

1. A method of producing a silicon nitride base sintered body, comprising the steps of:
   shaping a powder mixture consisting essentially of a silicon nitride powder as the principal material and a sintering aid which is a combination of $Y_2O_3$ and at least one additional metal oxide selected from the group consisting of $Nd_2O_3$ and $Sm_3O_3$ into a green body, the molar ratio of said $Y_2O_3$ to said at least one additional metal oxide being in the range from 9:1 to 1:9; and
   sintering the green body in a nitrogen gas atmosphere the pressure of which is in the range from 2 atm to 100 atm at a temperature in the range from 1900° to 2200° C. to produce and effectively utilize a sufficient quantity of liquid phase in the green body under sintering to provide an improved combination of density and strength at room and elevated temperatures.

2. A method according to claim 1, wherein said sintering aid amounts to 50–30 wt % of said powder mixture.

3. A method according to claim 1, wherein at least a major portion of said silicon nitride powder is $\alpha$-$Si_3N_4$.

4. A method according to claim 1 wherein said additional metal oxide is $Sm_2O_3$.

5. A method according to claim 1 wherein said silicon nitride powder has a mean particle size not larger than 1 $\mu$m.

* * * * *